United States Patent [19]

Coulter

[11] 4,230,255
[45] Oct. 28, 1980

[54] PROTECTIVE SHELL FOR NUCLEAR REACTOR AND METHOD FOR ASSEMBLING THE SHELL

[75] Inventor: Leland E. Coulter, New Canaan, Conn.

[73] Assignee: Teledyne, Inc., Los Angeles, Calif.

[21] Appl. No.: 944,266

[22] Filed: Sep. 21, 1978

Related U.S. Application Data

[62] Division of Ser. No. 607,181, Aug. 25, 1975.

[51] Int. Cl.$^2$ .............................................. E04G 11/04
[52] U.S. Cl. ...................................... 228/184; 29/467; 52/80; 52/747; 228/212
[58] Field of Search ................ 228/184, 212; 52/80, 52/747, 748; 29/423, 464, 467

[56] References Cited

U.S. PATENT DOCUMENTS

| | | | |
|---|---|---|---|
| 2,576,167 | 11/1951 | Zick | 52/80 X |
| 3,011,674 | 12/1961 | Jackson | 220/429 X |
| 3,108,704 | 10/1963 | Worley et al. | 176/87 |
| 3,234,102 | 2/1966 | Brown et al. | 176/60 |
| 3,245,179 | 4/1966 | Hawkins | 52/80 |
| 3,590,448 | 7/1971 | Bryant | 52/80 |
| 3,618,818 | 11/1971 | Puyo et al. | 220/3 |

*Primary Examiner*—Francis S. Husar
*Assistant Examiner*—K. J. Ramsey
*Attorney, Agent, or Firm*—St. Onge, Steward, Johnston, Reens & Noe

[57] ABSTRACT

A method for assembling a large massive steel shell is disclosed for housing a nuclear reactor while having sufficient strength to contain an explosion of such nuclear reactor. The shell is formed of large heavy gauge metal plates which are welded to each other to form a large sphere. Locating and supporting rings are mounted concentrically on a base. The rings increase in height from the center of the sphere to support and locate correspondingly higher annular segments of the sphere. The rings are erected and positioned with precisely adjustable tie rods so that the annular upper edge of the rings have a correspondingly accurately known position with respect to the annular sphere segments to be supported by the rings. The large heavy plate segments are then mounted on the rings and welded together to form a lower spherical portion whose spherical shape closely conforms to that desired for the sphere. The spherical structure is horizontally encircled with a long heavy gauge cable mounted at a midsection of the spherical shell. The cable encircles the sphere with a multiple number of wraps and is tensioned to provide a sufficient inwardly directed force for inhibiting an equatorial bulge.

10 Claims, 10 Drawing Figures

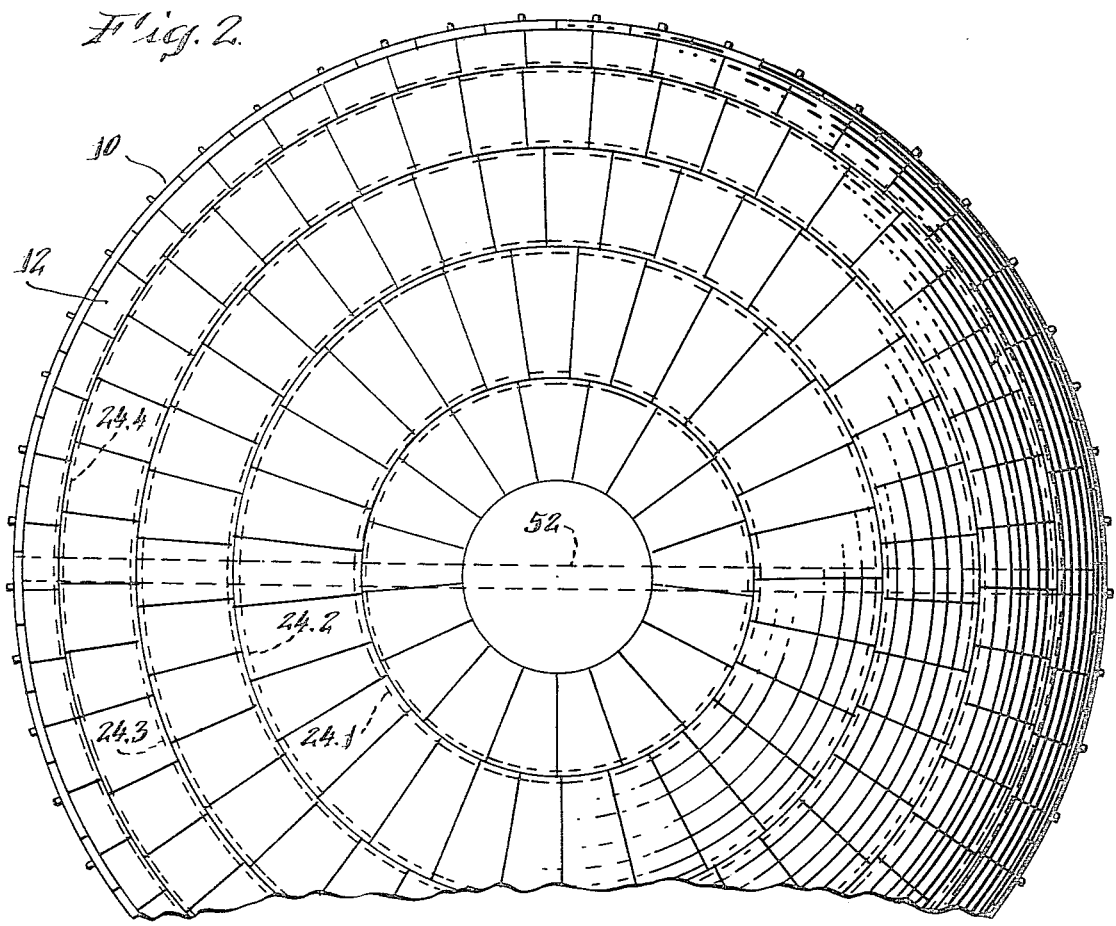
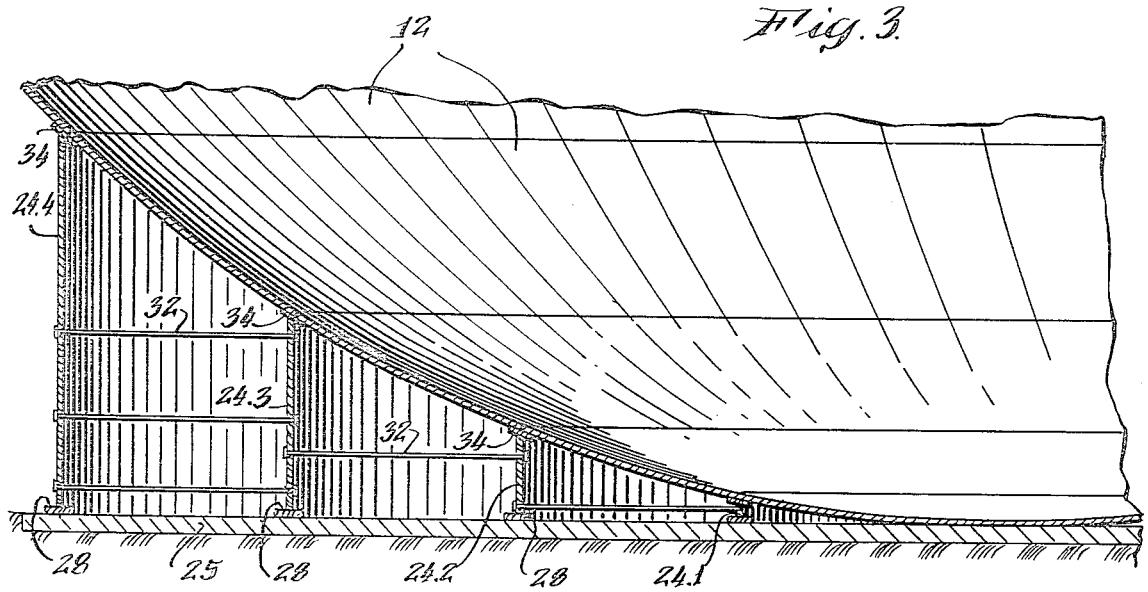

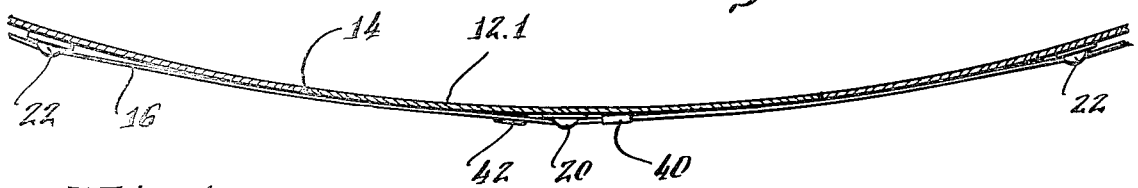
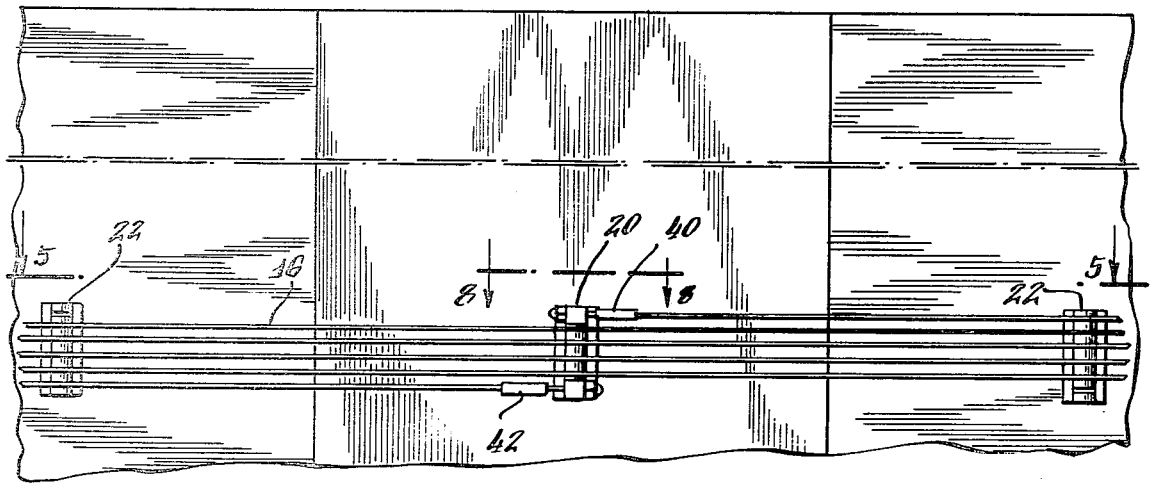
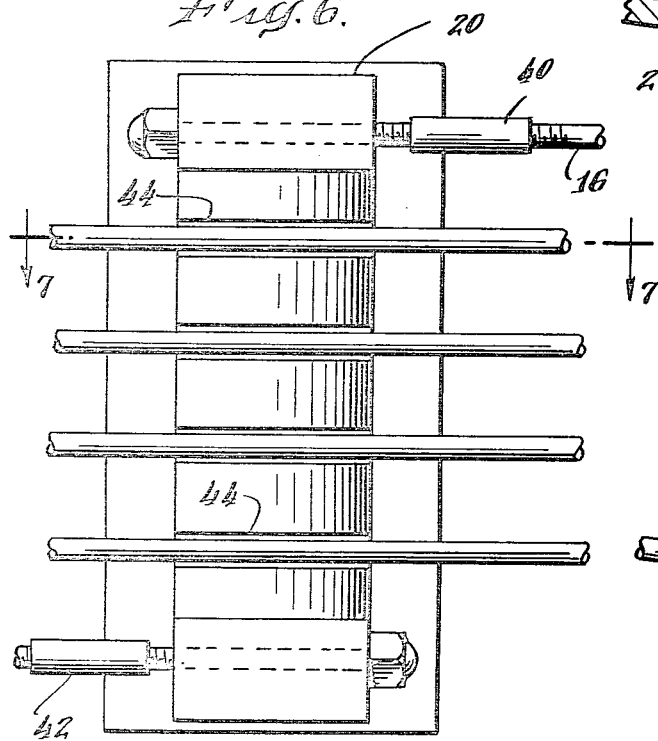
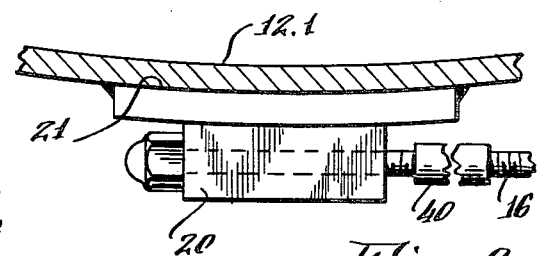
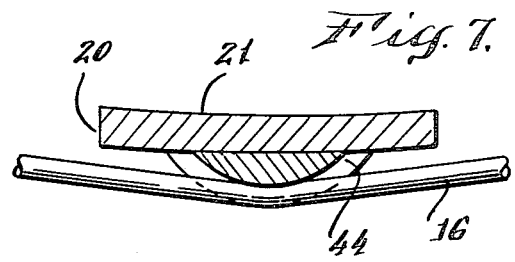

PROTECTIVE SHELL FOR NUCLEAR REACTOR AND METHOD FOR ASSEMBLING THE SHELL

This is a division of application Ser. No. 607,181, filed Aug. 25, 1975.

This invention relates to a shell for containing the explosion of a nuclear reactor located in the shell.

BACKGROUND OF THE INVENTION

A concern for nuclear power plants involves the containment of radioactive material in the event of an explosion of the nuclear reactor used in such plant. Nuclear reactors have been enclosed in steel spheres in order to contain an explosion.

SUMMARY OF THE INVENTION

With a protective shell in accordance with the invention for containing the explosion of a nuclear reactor, a massive hollow sphere of heavy steel is formed. Structural features are provided to preserve the spherical shape of the shell and enhance its explosion containment capability. The sphere is formed with a plurality of welded spherical segments. The sphere rests upon a plurality of heavy steel rings which are compatible with the thermal explansion characteristics of the sphere to maintain both its sphericity and its structural integrity and are employed during assembly of the shell to conform the lower portion of the shell to a spherical shape. A longitudinal cable is used to horizontally encircle the sphere about its midsection with a sufficient number of wraps and tension to reduce equatorial bulging of the massive sphere. With a protective shell in accordance with the invention an earthquake protective steel structure is provided whose flexibility enables the shell's structural integrity to be maintained even when exposed to strong earthquakes.

It is, therefore, an object of the invention to provide a hollow shell of sufficient strength for containing an explosion of a nuclear reactor located in the shell and a method for assembling such shell.

BRIEF DESCRIPTION OF DRAWINGS

These and other advantages and objects of the invention for a shell housing a nuclear reactor can be understood from the following detailed description of a preferred embodiment described in conjunction with the drawings wherein

FIG. 2 is a partial top plan view of the shell shown in FIG. 1;

FIG. 3 is a partial vertical section of a bottom part of the shell shown in FIG. 1;

FIG. 4 is a partial enlarged side view in elevation of the midsection of the shell shown in FIG. 1;

FIG. 5 is a horizontal section of the shell taken along the line 5—5 in FIG. 4;

FIG. 6 is an enlarged side view in elevation of a saddle employed to retain a shape-retaining cable employed to maintain the spherical shape of the shell shown in FIG. 1;

FIG. 7 is a section view of the saddle of FIG. 6 taken along the line 7—7 in FIG. 6;

FIG. 8 is a top plan view of the saddle of FIG. 6 taken along the line 8—8 in FIG. 4;

DETAILED DESCRIPTION OF EMBODIMENT

Figure 1:
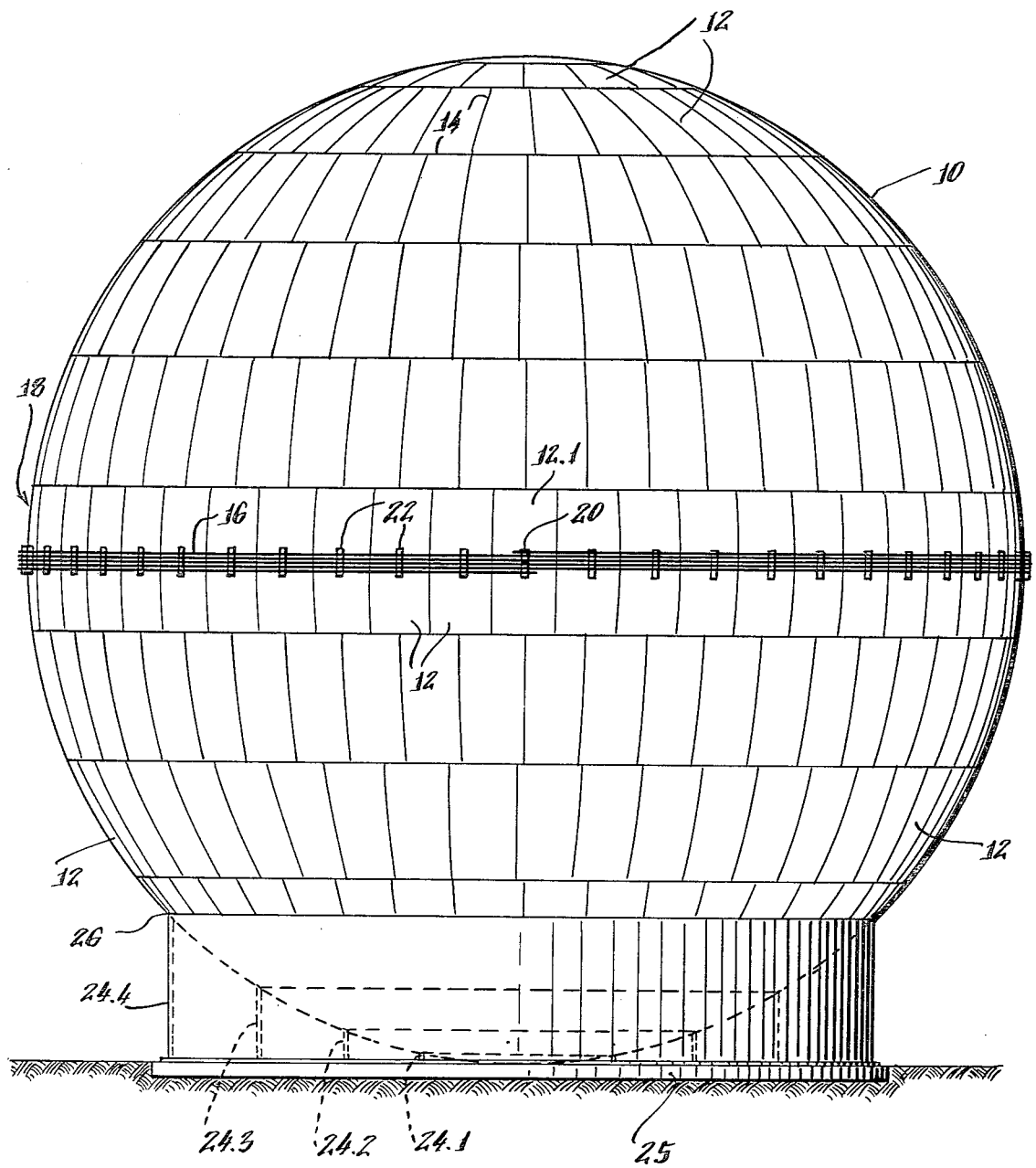
FIG. 1 is a side view in elevation of a completed shell for enclosing a nuclear reactor.

With reference to FIG. 1 a massive hollow sphere 10 is shown formed of a plurality of heavy steel spherical segments 12 which are welded together along seams 14. The sphere 10 is of a substantial size sufficient to enclose a nuclear reactor. Typical sizes for such a sphere may be a diameter of the order of two hundred feet to house a correspondingly large nuclear reactor at the center of the sphere 10.

It is desirable to maintain the spherical shape as closely as possible so that a centrally located nuclear reactor explosion will result in a more evenly distributed force-load on the sphere 10. Accordingly, the sphere 10 is provided with a girdling cable 16 wrapped around the horizontal midsection 18 of the sphere 10. Cable 16 is anchored to a main saddle 20 welded to a plate segment 12.1. The cable 16 is wrapped with multiple wraps around the midsection 18. In this manner tensioning of the cable 16 provides a correspondingly enlarged inwardly directed shape returning force to maintain the desired spherical shape. Other saddles 22 are employed between the cable 16 and each of the steel plate segments 12 at the midsection 18 to both transfer the inwardly directed cable force to the sphere 10 and vertically support the cable 16.

The sphere 10 is vertically supported with concentrically mounted rings 24 movably mounted above a suitable platform 25. Rings 24 are made of heavy gauge steel plates and are about three to six inches thick. The rings 24 are used during assembly of the sphere as fixtures which are permanently welded to the sphere 10 at annular contacts to distribute the vertical support. The rings 24 are shown in a multiple of four though a different number may be used depending upon the size and overall weight of sphere 10. The outer ring 24.4 is located to contact the sphere at an annular support area 26 which is located at about forty-five degrees from the vertical. For a sphere 10 of about two hundred feet in diameter the rings 24.1–24.4 may have diameters of the order of respectively forty, seventy, one hundred five and one hundred forty feet. The number and thickness of the rings 24 are selected to achieve a structural strength and flexibility for the entire sphere 10 in order to withstand strong earthquakes.

With reference to FIGS. 2 and 3, the locations of the vertical support rings 24 are more clearly illustrated. The support rings 24 movably rest upon heavy metal footing flanges 28 of two to three feet wide which are placed on a footing 25. The rings 24 are interconnected with horizontal radially extending and adjustable tie rods 32 sized to prevent buckling of rings 24 and are circumferentially distributed. The rings 24 engage the sphere 10 through support plates 34 welded to plate segments 12.

FIGS. 4 through 8 show the constructional features of the saddles 20, 22 with greater detail. Each saddle has a curved inner mounting surface 21 whose curvature is that of the outer mounting surface of sphere 10 for a flush fit therewith. The saddles 20, 22 are each welded to a steel plate segment 12 and supports the wraps of the single cable 16. An anchor saddle 20 is shown on which the cable 16 is anchored at both ends through tightening devices 40, 42 located at opposite ends of cable 16. The tightening devices 40, 42 may be hydraulic or mechanical turn-buckles which maintain the cable 16 at the appropriate tension needed to inhibit an equatorial bulge of the sphere 10 at its horizontal midsection 18. Each saddle 20 and 22 is provided with recesses 44 shaped to partially receive the cable 16 and vertically support it.

In the formation of the sphere 10, the spherical plate segments 12 are preferably made of high tensile strength steel of the order of about one hundred thousand pounds with a thickness from about one and one-half to about two and one-half inches. The thicker plates 12 would be used where openings into the sphere 10 are needed for access and pipes.

The steel plate segments 12 may be formed, after tempering, by cold rolling in a suitable mill with a compound convex idler roller having a suitable spherical segmental shape. The spherical plate segments 12 are formed by rolling a flat plate past the compound roller in one direction and then in an opposite direction to provide the desired spherical curvature needed to form the sphere 10. The spherical segments may be trimmed by an acetylene cutter or the like to the desired size needed in the construction of the sphere 10.

Figure 9:
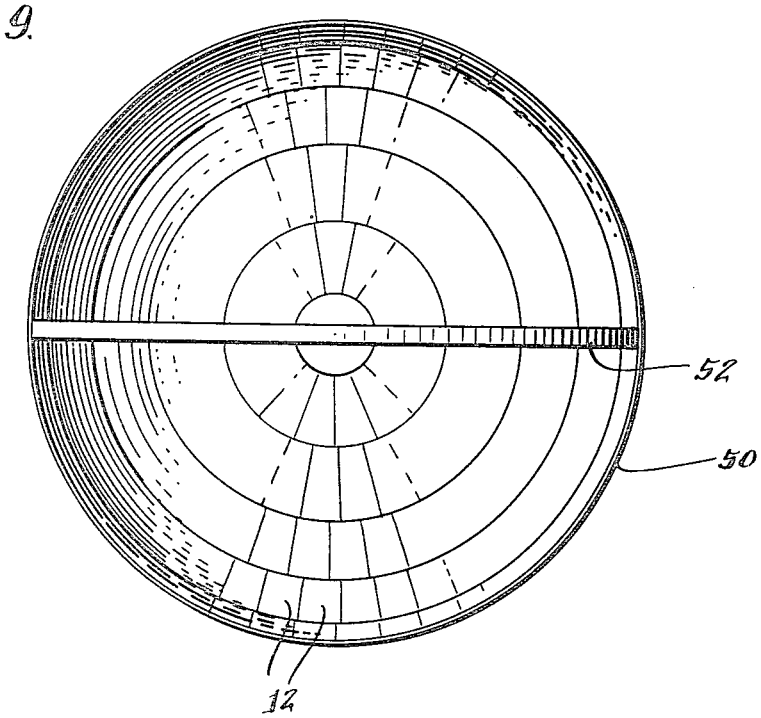
FIG. 9 is a top plan view of a partially completed shell during its construction.
Figure 10:
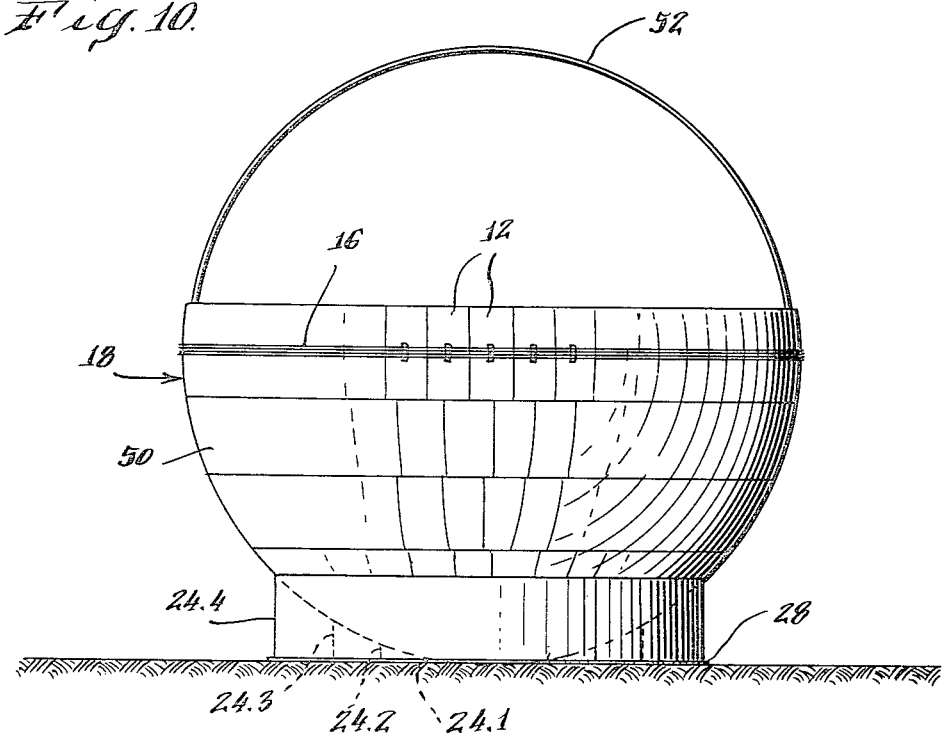
FIG. 10 is a side view in elevation of the partially completed shell showing a hoop used in the construction of the shell.

Initially, a lower hemispherical portion 50 of the sphere 10 is assembled as shown in FIGS. 9 and 10 by suitably welding of the seams 14 between the plate segments 12 on the inside of the portion 50. The plate segments are welded to each other with conventional seam welds and may be held in the required position with well known rigging techniques. For example, the plate segments 12 which may be of the size of about twenty feet high and about six to eight feet wide, are maneuvered into their respective desired positions with a crane and crane cables connected to retainer rings temporarily welded to a plate segment. The supported plate segment may then be tack welded to other plates and if properly placed, full seam welds are made.

In the assembly of sphere 10 the base 25 is poured and suitable optical sighting points are selected around the base 25 to enable precise spherical alignment of the rings 24 and plate segments 12. The rings 24 are thereupon erected, starting with the inner ring 24.1. The rings are vertically erected to a height which establishes precise annular alignment of the upper edges of the rings with the desired surface of sphere 10. An optical laser alignment tool may be employed to assure that the upper edge of each of the rings lies in a common horizontal plane.

The first and second rings are installed and are suitably radially supported with fixtures and tie rods 32 to maintain a vertical orientation and the proper radial alignment. An annular first layer of steel plates 12 is then welded to the flange 34 above rings 24.1 and 24.2 and to each other with the welds formed on the inside of the sphere 10.

After the first layer of plates 12, the third ring 24.3 is formed and is radially attached with adjustable tie rods 32 to the ring 24.2. The tie rods are of sufficient number and are annularly distributed to enable precise radial alignment of the rings 24. When the third ring has been aligned, the second layer of spherical plate segments 12 is welded into place to each other and the previously assembled annular layer of plate segments 12. This process is continued for as many rings 24 as may be employed.

In the embodiment four rings 24 are used, though one may appreciate that additional rings 24 can be used depending upon the height of the sphere to which alignment and support is required. When four rings 24 are used to support the sphere to a height of about forty-five degrees from the vertical, further layers of plate segments may be added by utilizing optical alignment techniques. For example, the plate segments 12 may be temporarily provided with a sufficient number of externally located mirrors to determine, with the aid of the previously determined optical sighting points, the three-dimensional position and orientation of each plate segment 12 just prior to being welded into place. When the measured position and orientation of the plate segment conforms to that determined necessary to obtain a spherical structure, the plate segment is welded. Conventional rigging techniques are used to support and maneuver each plate into its proper location.

When the lower spherical portion is completed, the saddles 20, 22 are provided with cable 16 which is properly tensioned to prevent distortion of the spherical structure.

After the lower hemispherical portion 50 has been completed, a hoop 52 is constructed as shown in FIGS. 9 and 10 extending in a diametral fashion from one side of the lower hemisphere 50 to the other in conformance with the inside spherical surface for sphere 10. The hoop 52 is mounted for movement in a circle generally concentric with the sphere 10 to enable the formation of the upper portion of the sphere 10.

The upper spherical portion may then be formed by constructing a first vertical arch of plates 12 which are tack-welded to each other and to the hoop 52. The completed arch is connected to the lower spherical portion at diametral opposite sides as determined by the position of the hoop 52. When the first arch is completed, full seam welds are made on the outside of the arch while the hoop 52 is disconnected from the arch. The hoop 52 is rotated to a new position where a new arch of plates 12 can be assembled to and alongside the first arch. This process of welding, joining and disengaging of the hoop 52 is repeated for different arches so that the hoop 52 may be used as a guide throughout the construction phase of the upper portion to orient the upper plate segments until the sphere 10 is completed.

Having thus described a shell for containing an explosion of a nuclear ractor and a method for assembling such shell, what is claimed is:

1. The method of assembling a large hollow spherical shell for housing a nuclear reactor or the like comprising the steps of forming a plurality of spherical segments to be assembled into the shell for enclosing a nuclear reactor or the like therein;

joining a first group of spherical segments comprising the lower hemispheric portion of the sphere to each other and to a support base;

assembling a hoop above the lower hemispheric portion, said hoop having an outer radius commensurate with that of the inner radius of said spherical shell;

temporarily securing a plurality of vertically oriented spherical segments to said hoop to form a first vertical arch extending along the desired shape of the shell from one side of the lower hemispheric portion to an opposite side;

joining said plurality of spherical segments to each other and to said lower hemispheric portion to form a first vertical self-supporting arch;

disengaging said hoop from said arch;

moving the hoop to an adjacent vertical support position and forming a second vertical arch of joined spherical steel segments in the same manner and joining said second to said adjacent first arch;

and then repeating said arch-forming hoop steps until the upper hemispherical portion of the spherical shell has been formed on and joined to the lower hemispherical portion.

2. The method of assembling a hollow shell for a nuclear reactor or the like as claimed in claim 1 further including the steps of encircling the lower hemispheric portion of said shell with a multiple number of wraps of a cable at approximately the equator of said shell and then tensioning the cable to provide an inwardly directed force to reduce equatorial bulge of said shell;

said steps being performed prior to assembly of said hoop above said lower hemispheric portion.

3. The method of assembling a hollow shell for a nuclear reactor or the like as claimed in claim 1 wherein said hoop is tack welded to said spherical segments to hold them prior to joining said spherical segments to one another to form a self-supporting first vertical arch.

4. The method of assembling a hollow shell for a nuclear reactor or the like as claimed in claim 1 wherein said spherical segments are joined by welding.

5. The method of assembling a hollow shell for a nuclear reactor or the like as claimed in claim 1 wherein said hoop is rotatable in a circle concentric with said spherical shell.

6. The method of assembling a hollow shell as claimed in claim 5 and further including the step of encircling the lower hemispheric portion of the shell with a multiple number of wraps of a cable at about the equator of said shell; and tensioning the cable to provide an inwardly directed force to reduce equatorial bulging of the shell.

7. The method of assembling a hollow, substantially spherical shell for a nuclear reactor or the like comprising the steps of assembling a plurality of vertical cylindrical rings upon a base platform, said upper annular edges of said rings being in alignment with the spherical surface of said shell;

joining spherical shell plate segments to the upper annular ring edges to form a lower spherical portion of the shell;

joining additional spherical plate segments to form the lower hemispheric portion of said shell;

assembling a vertical hoop on said lower hemispheric portion, said hoop having an outer radius commensurate with the inner radius of said spherical shell;

temporarily securing spherical segments on and over said hoop to form a first vertical arch extending along the desired shape of the spherical shell from one side of the lower hemispheric portion to an opposite side;

joining the segments of said first arch together and to said lower hemispheric portion;

disengaging the hoop from said arch and then moving the hoop to an adjacent support position and joining a second vertical arch of spherical steel segments to each other, to said first vertical arch and to said lower hemispheric portion;

and then repeating said arch forming steps until the upper hemispherical portion of the spherical shell has been formed on and joined to the lower hemispheric portion.

8. The method of assembling a hollow shell as claimed in claim 7 wherein the vertical ring assembling step further includes coupling a plurality of generally horizontally oriented tie rods between the rings; and adjusting the length of the rods to align the upper edges of the rings with the spherical surface of said shell.

9. The method of assembling a hollow shell as claimed in claim 7 wherein said spherical shell plate segments are joined by welding.

10. The method of assembling a hollow, substantially spherical shell for a nuclear reactor or the like comprising the steps of assembling a plurality of vertical cyclindrical steel rings upon a base platform;

coupling a plurality of tie rods in a generally horizontal orientation between each of said rings to position the rings so that said upper annular edges of said rings are in alignment with the spherical surface of said shell;

joining spherical shell plate segments to the upper annular ring edges to form a lower spherical portion of the shell;

joining additional steel spherical plate segments to form the lower hemispheric portion of said shell;

encircling the said lower hemispheric portion at about the equator of said spherical shell with a multiple of cable wraps;

tensioning the cable to provide an inwardly directed force to reduce equatorial bulging of said shell;

assembling a vertical hoop on said lower hemispheric portion, said hoop having an outer radius commensurate with the inner radius of said spherical shell;

temporarily securing steel spherical segments on and over said hoop to form a first vertical arch extending along the desired shape of the spherical shell from one side of the lower hemispheric portion to an opposite side;

joining the segments of said first arch together and to said lower hemispheric portion;

disengaging the hoop from said arch and then moving the hoop to an adjacent support position and joining a second vertical arch of spherical steel segments to each other, to said first vertical arch and to said lower hemispheric portion;

and then repeating said arch forming steps until the upper hemispherical portion of the spherical shell has been formed on and joined to the lower hemispheric portion.

* * * * *